Aug. 22, 1939.　　　P. C. NICHOLSON　　　2,170,594
LINE RELEASE CLIP AND SIGNAL
Filed Nov. 19, 1938
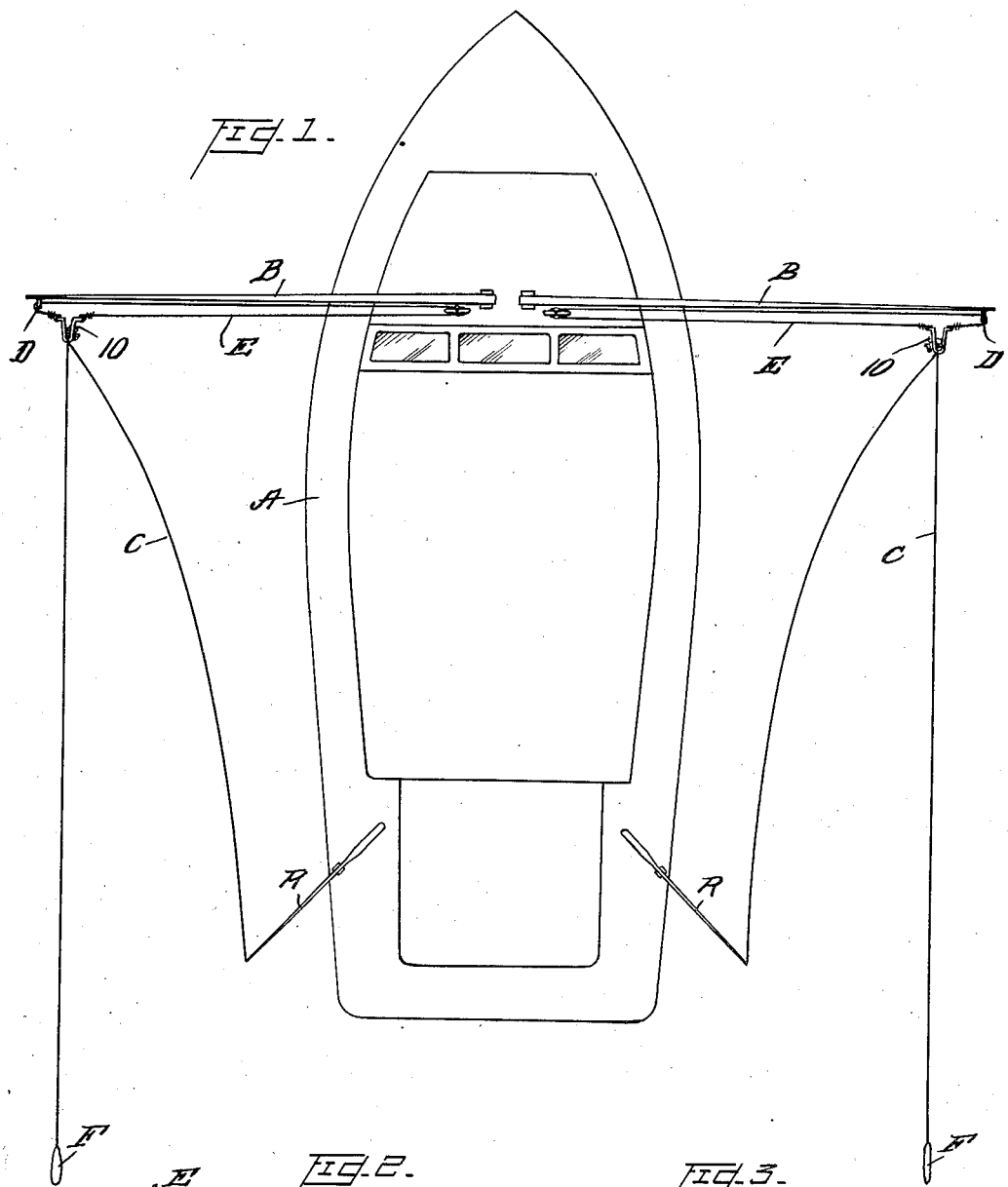
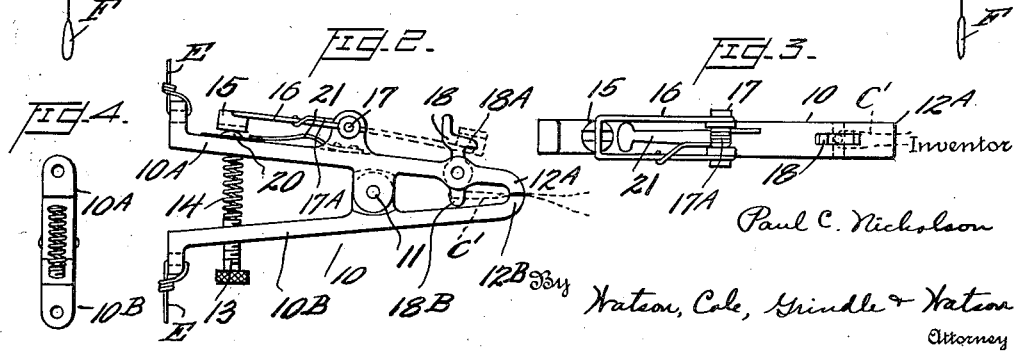
Inventor
Paul C. Nicholson
By Watson, Cole, Grindle & Watson
Attorney Patented Aug. 22, 1939

2,170,594

UNITED STATES PATENT OFFICE 2,170,594

LINE RELEASE CLIP AND SIGNAL

Paul C. Nicholson, Providence, R. I.

Application November 19, 1938, Serial No. 241,455

3 Claims. (Cl. 43—17)

This invention relates to a clip for releasably holding a line, such as a fishing line, and for giving a signal when the line is pulled or jerked out of the clip. The device is primarily intended for use in fishing for swordfish, marlin, sail fish, etc., from a moving boat having outriggers and also having some form of clip to hold the fishing line adjacent the outer end of the outrigger so that the bait dragging along the water will be kept clear of the wake of the boat. When the bait is seized by a fish and the line jerked from the clip, the fisherman proceeds to capture the fish. In such fishing, it is important to carefully watch the bait to see when it has been taken by a fish. Sometimes the glare of the sun on the water is very intense and hard on the eyes and makes the bait impossible to see. The present invention aims to provide a clip which will effectively hold a fishing line on an outrigger, which can be easily and readily manipulated to attach the line thereto and which is provided with means for giving a signal when the line is pulled out of the clip, thus making it unnecessary for the fisherman to keep his eyes on the bait at all times. The invention is illustrated in the accompanying drawing, forming a part thereof, and in which Figure 1 is a diagrammatic view illustrating the use of the invention;

Figure 2 is a longitudinal side view of the improved clip showing the manner of attaching the fishing line and the haul lines thereto;

Figure 3 is a top view of a clip; and

Figure 4 is an end view thereof.

As indicated in the drawing, particularly in Figure 1, the boat A, is provided on each side with an outrigger B extending laterally thereof and to each of which a fishing line C is releasably connected. Referring to the arrangement on one side only, the outrigger B carries at its outer end a ring or eye D through which a haul line E passes, the line being secured to a cleat mounted at a convenient point on the boat. A clip 10, to which the present invention particularly relates, is secured to the haul line E so that the clip can be hauled out to the end of the outrigger or hauled in to the deck of the boat. As shown, the fishing line C extends from the fishing rod R carried by the fisherman outwardly to the clip 10 and then downwardly to the bait F which is dragged along the surface of the water when the boat is in motion.

The clip 10 comprises two members 10A and 10B which are pivoted together intermediate their length by a pivot pin 11. The ends of the members 10A and 10B on one side of the pivot 11 are shaped to form clamping jaws 12A and 12B for releasably holding the fishing line C, as indicated particularly in Figures 2 and 3. The line being formed into a loop C' which is placed between said jaws. On the other side of the pivot 11, an adjustable set screw 13 is threaded into the member 10B and a coiled tension spring 14 is arranged between this set screw and the other member 10A of the clip. By adjusting the set screw 13 the tension of the spring 14 can be so regulated that the line C will be held between the jaws 12A, 12B until a pull is exerted thereon by a fish seizing the bait. In the type of fishing mentioned, the baits used may vary from one ounce to ten pounds or more, which means that the tension on the jaws of the clip 10 must be varied. The adjustable screw 13 and spring 14 permit regulation of the tension on the jaws to fit the conditions desired.

The clip 10 also includes means for giving a signal to the fisherman when the fishing line is jerked or pulled out of the clamping jaws 12A, 12B. To this end a hammer 15 is carried by an arm 16 pivotally mounted by a pin 17 on the member 10A of the clip and a coiled spring 17A surrounding the pivot 17 and bearing against the arm 16 serves to throw the hammer over into the position shown in Figure 2 when the spring is free to act. A trigger 18 is also pivotally carried by the member 10A of the clip and the outer end thereof is provided with a hooked portion 18A which is adapted to engage the hammer 15 or a part of the hammer arm 16 and the trigger thus serves to hold the hammer in a retracted position against the tension of the spring 17A. The inner end 18B of the trigger 18 is arranged between the jaws 12A and 12B of the clamp and when the fishing line is clamped between these jaws, the loop C' therein extends around the inner end 18B of the trigger. When the fishing line is jerked or pulled out of the jaws 12A, 12B, it will exert a pull on the trigger 18 and release the hammer 15 which will be thrown over to the position shown in Figure 2 by the spring 17A. The hammer 15 is designed to strike an explosive cap or other suitable explosive device 20 placed on the member 10A of the clip and held in position by a suitable spring clip 21 secured to the member 10A. The explosion of the cap is a signal to the fisherman that the fishing line has been pulled from the clip 10 by a fish striking the bait and the fisherman can then proceed to capture the fish.

In setting the device for operation, the baited fishing line C is slacked out to the desired distance and the small loop C' formed therein which is engaged over the inner end 18B of the trigger with the sides of the loop placed between the jaws 12A, 12B of the clip 10, the hammer 15 being drawn back and held by the trigger. The tension on the jaws is regulated by adjusting the set screw 13 so that the grip of the jaws will be strong enough to hold the line securely, regardless of the size of bait being used, but weak enough to release the line when a fish hits the bait. The clip 10 is then pulled out to the end of the outrigger B by the haul line E and the device is in condition for use.

Various changes may be made in the details of the device and the manner of using the same; for example, the clip may be attached to some other support than an outrigger. Also, the device may obviously be used as an alarm to indicate opening of a window or a door or unauthorized entrance through a gate or over a threshold, in which case the line connected to the trigger will be fastened in such position that a pull will be exerted on the trigger to release the hammer and explode the alarm cap.

Having thus described the invention, what is claimed as new and desired to be secured by Letters Patent is:

1. A fishing line release clip and alarm of the kind described comprising two members pivotally connected intermediate their ends, the ends of said members on one side of said pivot being shaped to form cooperating clamping jaws between which a fishing line may be releasably held, a spring for yieldably pressing said jaws together, means for regulating the tension of said spring to vary the pressure between said jaws, a spring operated hammer carried by one of said members, a trigger for holding said hammer in retracted position, said trigger being pivotally supported on one of said members adjacent said jaws, means for holding an explosive device in position to be struck by the hammer when the same is released, said trigger having a part engageable by the line whereby the trigger is operated and the hammer released when the line is pulled out of said jaws.

2. A line release clip and alarm for use in outrigger fishing and comprising means for holding the clip adjacent the outer end of an outrigger on a boat and for drawing the same inwardly to the boat, said clip having two members pivotally connected intermediate their ends, the ends of said members on one side of said pivot being shaped to form cooperating jaws between which a fishing line may be releasably held, an adjustable spring arranged between the opposite ends of said members for forcing the same apart and for forcing said jaws together, and means carried by said clip and engageable by said line for producing an alarm when said line is pulled out of said jaws.

3. In combination with an outrigger on a boat, a clip for releasably holding a fishing line, a haul line carried by said outrigger and connected to said clip whereby the latter may be hauled outwardly or inwardly relative to the outrigger, said clip comprising two members pivotally connected intermediate their ends, the ends of said members on one side of said pivot being shaped to form cooperating jaws between which the fishing line may be releasably held, an adjustable spring for forcing said jaws together, and means carried by said clip and engageable by said line for producing an alarm when said line is pulled out of said jaws.

PAUL C. NICHOLSON.